US008988371B2

(12) United States Patent
Ho

(10) Patent No.: US 8,988,371 B2
(45) Date of Patent: Mar. 24, 2015

(54) TOUCHSCREEN AND TOUCH PANEL DISPLAY AND PRODUCING METHOD THEREOF

(75) Inventor: Wei-Hsuan Ho, Hsinchu County (TW)

(73) Assignee: Hannstar Display Corp., New Taipei (TW)

( * ) Notice: Subject to any disclaimer, the term of this patent is extended or adjusted under 35 U.S.C. 154(b) by 265 days.

(21) Appl. No.: 13/368,016

(22) Filed: Feb. 7, 2012

(65) Prior Publication Data
US 2013/0106726 A1    May 2, 2013

(30) Foreign Application Priority Data

Oct. 31, 2011 (TW) .............................. 100139673 A

(51) Int. Cl.
*G06F 3/041* (2006.01)
*B32B 38/14* (2006.01)
*G06F 3/044* (2006.01)

(52) U.S. Cl.
CPC ...... *G06F 3/044* (2013.01); *G06F 2203/04103* (2013.01)
USPC .......................................... 345/173; 345/156

(58) Field of Classification Search
USPC .................................................. 345/156, 173
See application file for complete search history.

(56) References Cited

U.S. PATENT DOCUMENTS

| 8,558,807 | B2 * | 10/2013 | Lin ................................ 345/173 |
| 8,586,874 | B2 * | 11/2013 | Kuriki ........................... 174/261 |
| 2003/0052867 | A1 * | 3/2003 | Shigetaka et al. ............. 345/173 |
| 2008/0252612 | A1 * | 10/2008 | Yu .................................. 345/173 |
| 2010/0265193 | A1 * | 10/2010 | Kung et al. .................... 345/173 |
| 2011/0141042 | A1 * | 6/2011 | Kim et al. ...................... 345/173 |
| 2011/0291978 | A1 * | 12/2011 | Ho et al. ........................ 345/173 |
| 2013/0181925 | A1 * | 7/2013 | Kim et al. ...................... 345/173 |

* cited by examiner

*Primary Examiner* — Amare Mengistu
*Assistant Examiner* — Jennifer Zubajlo
(74) *Attorney, Agent, or Firm* — Muncy, Geissler, Olds & Lowe, P.C.

(57) ABSTRACT

Embodiments of this invention provide touch panel display, touchscreen and their producing method. In an embodiment, the touch panel display comprises a display and a touchscreen, which comprises two substrates, whose surface respectively comprise sensing patterns. In addition, conductive circuits are arranged at one of the two substrates, to connect the sensing patterns by direct or indirect manner.

18 Claims, 5 Drawing Sheets

TOUCHSCREEN AND TOUCH PANEL DISPLAY AND PRODUCING METHOD THEREOF

CROSS REFERENCE TO RELATED APPLICATIONS

The entire contents of Taiwan Patent Application No. 100139673, filed on Oct. 31, 2011, from which this application claims priority, are incorporated herein by reference.

BACKGROUND OF THE INVENTION

1. Field of the Invention

The present invention relates to touchscreens, touch panel displays, and their producing methods having advantages of low cost and high yield rate.

2. Description of the Prior Art

Touch panel displays incorporated with touch control and display technologies are widely used in electronic devices, such as cellular phones, digital cameras, computers, televisions, and so on. The user interface of such devices not only presents visual information but also allows a user to perform operations.

Touch panel displays can be divided into on cell touch panel displays and in cell touch panel displays. The in cell touch panel displays integrate touch sensors or photo sensors into the pixels of the liquid crystal display. The on cell touch panel displays include a touchscreen and a display, in which the former comprises touch sensors constructed by transparent patterns and the latter may be a liquid crystal display. Various types of touchscreen with different structures, such as resistance, capacitance, infrared rays, and surface acoustic wave type of touchscreen have been developed.

FIG. 1 is a simplified diagram showing configuration and fabricating method of a conventional capacitance type of touchscreen. Two substrates 10 and 11 are firstly provided. Then, an indium tin oxide (ITO) layer (not shown) and a metal layer (not shown) are formed on a surface of each substrate 10/11. The indium tin oxide layers and the metal layers are then etched to form a sensing pattern layer 12a and a conductive wire layer 13a on the surface of the substrate 10, and form a sensing pattern layer 12b and a conductive wire layer 13b on the surface of the substrate 11. The sensing pattern layers 12a/12b sense touch positions of the user, and the conductive wire layers 13a/13b connect the sensing pattern layers 12a/12b, respectively. After that, an adhesive layer 14 is employed to bond the two substrates 10/11 and thus form a touchscreen 1. Further, a printed circuit board 15, typically a flexible printed circuit 15, is used to electrically connect the conductive wire layer 13a/13b and conduct the signals of the sensing pattern layers 12a/12b to a controller (not shown). Typically, conductive circuits are laid on both surface of the printed circuit board 15, i.e., a double layer circuit layout, in which the conductive circuits of one surface connect to the conductive wire layer 13a, and the conductive circuits of the other surface connect to the conductive wire layer 13b. In addition, a printing method using conductive silver paste may be employed to form the conductive wire layers 13a/13b.

The conventional method is complicated. In addition, as higher resolution of the touchscreen 1 is requested, the line width/line space of the sensing pattern layers 12a/12b and the conductive wire layers 13a/13b will get smaller and thus the yield rate is decreased due to the more precise configuration.

In view of the foregoing defects, a need is arisen that to provide novel touchscreens and their fabricating methods for improving the yield rate and lowering the cost.

SUMMARY OF THE INVENTION

An object of the present invention is to provide touchscreens, touch panel displays, and their producing methods having advantages of low cost and high yield rate.

An embodiment of this invention provides a touchscreen comprising a first substrate, a second substrate, and an insulating layer disposed between the first substrate and the second substrate. A plurality of first sensing patterns and a plurality of conductive wires connected with each other are disposed on a first surface of the first substrate facing the second substrate. A plurality of second sensing patterns are disposed on a second surface of the second substrate facing the first substrate. A conductive component is employed to electrically connect the second sensing patterns and the conductive wires.

Another embodiment of this invention provides a touch panel display comprising a display and a touchscreen. The display presents a visual information. The touchscreen allows a user to perform operations by touching, and the detail of the touchscreen is the same as the above-mentioned embodiment.

Another embodiment of this invention provides a method for producing a touchscreen that comprises the following steps: providing a first substrate and a second substrate; forming a plurality of first sensing patterns on a first surface of the first substrate; forming a plurality of second sensing patterns on a second surface of the second substrate; forming a plurality of conductive wires on the first surface or the second surface, wherein the conductive wires comprises a first portion connected with the first sensing patterns and a second portion connected with the second sensing patterns via at least a conductive component; bonding the first substrate and the second substrate via an adhesive layer, wherein the first sensing patterns face the second sensing patterns.

DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations are not been described in detail in order not to unnecessarily obscure the present invention. While drawings are illustrated in details, it is appreciated that the quantity of the disclosed components may be greater or less than that disclosed, except expressly restricting the amount of the components.

Figure 1:
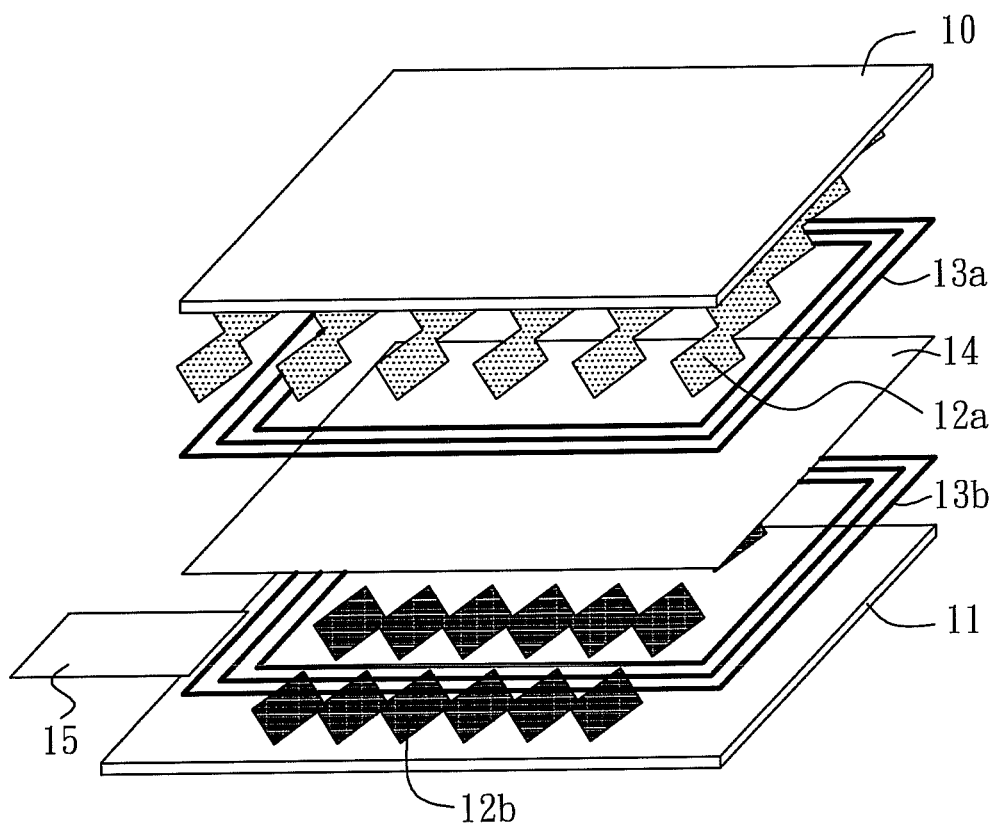
FIG. 1 is a simplified diagram showing configuration and fabricating method of a conventional capacitance type of touchscreen.
Figure 2:
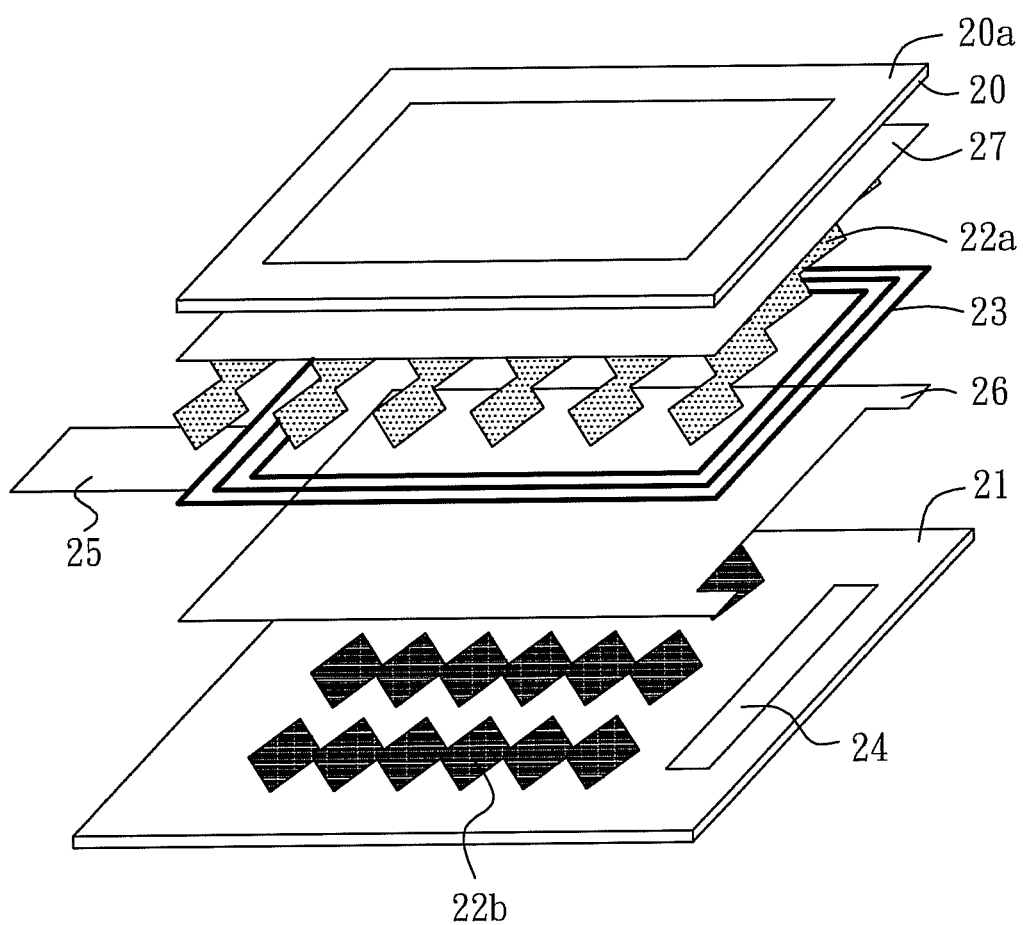
FIG. 2 shows a touchscreen and its forming method according to an embodiment of this invention.

FIG. 2 shows a touchscreen 2 and its forming method according to an embodiment of this invention. First, a substrate 20 and a substrate 21 are provided. After that, a plurality of sensing patterns 22a and a plurality of sensing patterns 22b are respectively formed on the inner surfaces of the substrate 20 and the substrate 21, i.e., formed on the two inner surfaces of the two substrates 20/21 facing each other. Further, a plurality of conductive wires 23 are formed on the inner surface of the substrate 20 or the substrate 21, e.g., the inner surface substrate 20 for illustrative purpose. The sensing patterns 22a/22b are used for sensing touch positions of the user, and a portion of the conductive wires 23 connects to the sensing pattern 22a. The conductive wires 23 and the sensing patterns 22a/22b may be formed by lithography, printing, ink-jet, or other methods known in the art. After that, a conductive component 24 may be formed or disposed on the inner surface of the substrate 20 or the inner surface of the substrate 21. For illustrative purpose, the conductive component 24 is preferably an anisotropic conductive film (ACF) and is disposed on a specific area of the inner surface of the substrate 21. An adhesive layer 26 is then used to bond the substrate 20 and the substrate 21, and a touchscreen 2 is thus formed. Via the conductive component 24, the signals of the sensing patterns 22b are transmitted to another portion of the conductive wires 23. A monolayer printed circuit board 25, i.e., a printed circuit board with conductive traces laid only on its one surface, is employed to conduct out all signals of the conductive wires 23, including signals transmitted by the sensing patterns 22a and sensing patterns 22b.

Further, one or more optical layers 27 may be formed between the substrate 20 and the sensing patterns 22a, and/or between the substrate 21 and the sensing patterns 22b. In this embodiment, the substrate 20 is used as a cover lens facing the user, and the one or more optical layers 27 are used to obscure the profiles of the sensing patterns 22a/22b by locally altering the refractive index. Furthermore, the substrate 20 may further comprise shielding 20a for hiding the below-arranged conductive wires 23. In another embodiment, instead of the substrate 20, the substrate 21 is used as a cover lens facing the user. In another embodiment, dummy patterns (not shown) are arranged between the sensing patterns 22a/22b and electrically disconnected with the sensing patterns 22a/22b, for obscuring the profiles of sensing patterns 22a/22b.

In the above-mentioned embodiment, the substrate 20 and the substrate 21 may be made of a same material or two different materials, such as glass, polymer, other materials known in the art, and combinations thereof. That materials may include, but are not limited to, polyethylene terephthalate (PET), polycarbonate (PC), polyether sulfone (PES), triacetyl cellulose (TAC), polymethylmethacrylate (PMMA), polyethylene (PE), polyimide (PI), composite material of polycarbonate (PC) and polymethylmethacrylate (PMMA), and the like. In a particular embodiment, the substrate 20 is a glass substrate, and the substrate 21 is a polyethylene terephthalate film. In another embodiment, the substrate 20 is a polyethylene terephthalate film, and the substrate 21 is another polymer film.

In addition, materials used for making the sensing patterns 22a/22b may include, but are not limited to, indium tin oxide (ITO) and carbon nano tube. The sensing patterns 22a/22b may have other geometric shapes or profiles constructed by various geometrical patterns except those shown in the drawings of this invention. The sensing patterns 22a/22b construct touch sensors to sense a touching position. The user's press alters the capacitance of the touching position, and the coordinate of which is hence can be determined.

Further, materials used for making the conductive wires 23 may include, but are not limited to, alloy of molybdenum aluminum molybdenum (MAM), copper, silver, metals, alloys, or other materials known in the art.

Furthermore, the conductive component 24 may comprise, but are not limited to, anisotropic conductive film (ACF), anisotropic conductive paste (ACP), other conductive components known in the art, or combinations thereof.

Moreover, the adhesive layer 26 is used for bonding the substrate 20 and the substrate 21. It may be an adhesive with sufficient transmittance and bonding capacity. The adhesive layer 26 may include, but is not limited to, an optically clear adhesive (OCA) or a composite film consisted of one or more insulating layers, preferably adhesive insulating layers.

Notice that in the above-mentioned embodiment, the conductive wires 23 may be formed on the substrate 21 instead of the substrate 20, and the conductive component 24 may be formed on the substrate 20 or the substrate 21. Similarly, all signals of the conductive wires 23, including signals transmitted by the sensing pattern 22a and sensing pattern 22b, are also conducted by the monolayer printed circuit board 25.

Because the conductive wires are formed on one surface of one substrate instead of two surfaces of two substrates, the manufacturing steps can be simplified and the quantity of the materials used for the process can be reduced. For instance, if the conductive wires 23 are formed on the substrate 20, at least two steps for forming conductive wires 23 on the substrate 21 by lithography will be unnecessary and the materials of which can be saved. In addition, experimental results show that the yield rate of forming conductive wires 23 on one substrate is higher than the yield rate of forming conductive wire layers 13a/13b on two substrates. This is quite true for some substrates. For example, forming the conductive wires 23 on a glass substrate rather than a plastic substrate can significantly promote the yield rate.

In addition, the printed circuit board 25 is preferably a flexible print circuit (FPC). Because all signals of the sensing patterns 22a/22b are conducted by the conductive wires 23 arranged on one substrate, the printed circuit board 25 is preferably monolayer circuit layout. Conventional touchscreens typically employ a printed circuit board 15 with double-layer circuit layout to conduct the signals of conductive wire layer 13a and conductive wire layer 13b, respectively. The conventional configuration and method has a disadvantage that shifts are usually present during the orientation process between the printed circuit board 15 and the two substrates, and this invention provides a solution to overcome it.

Figure 3:
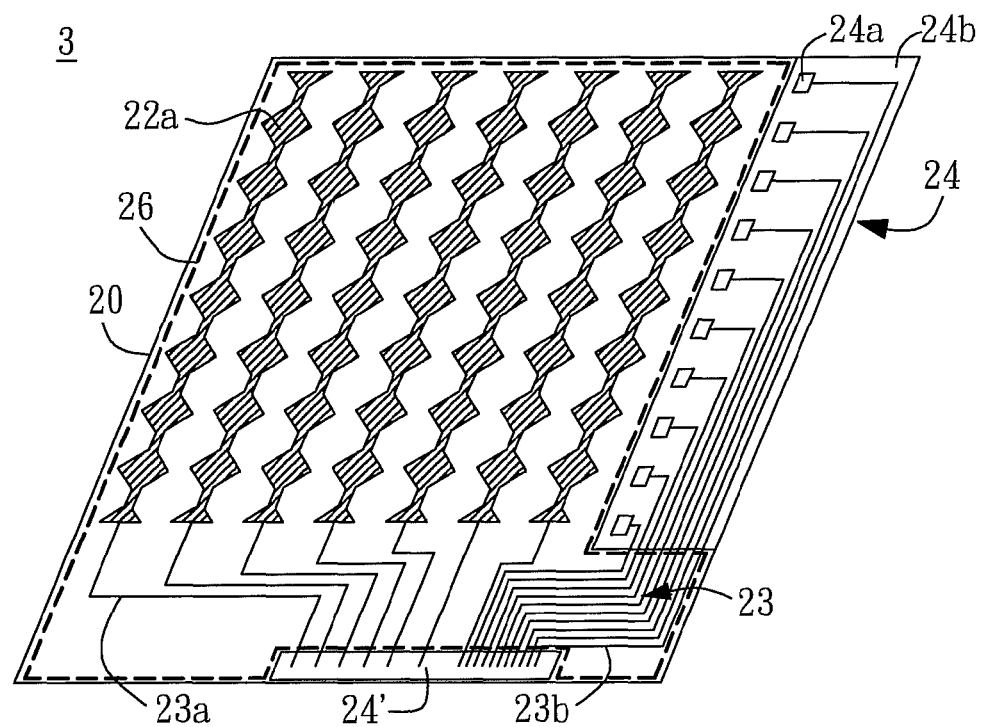
FIG. 3 shows a touchscreen according to a preferred embodiment of this invention.
Figure 3:
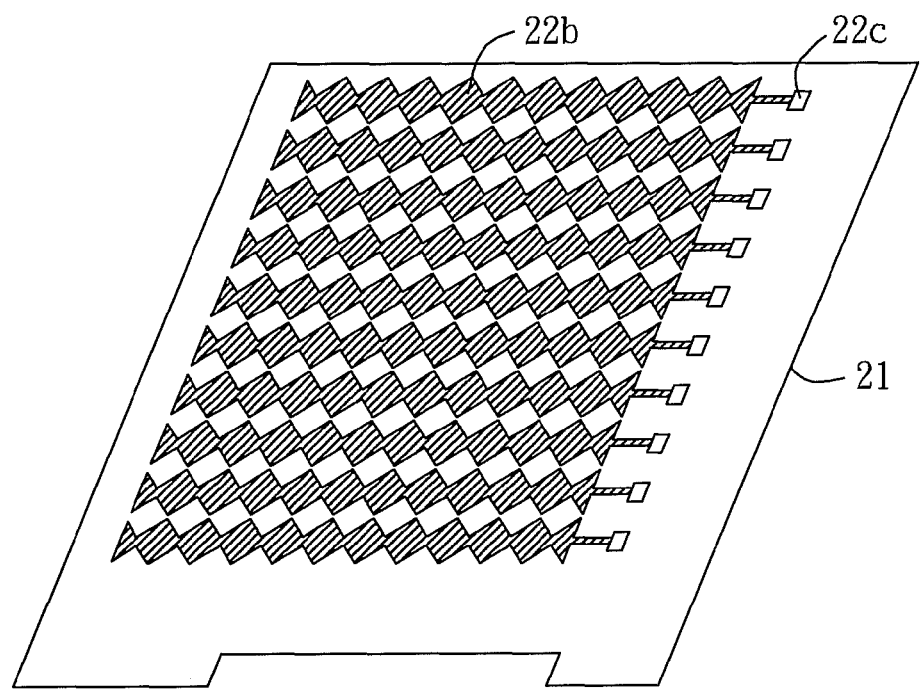

FIG. 3 shows a touchscreen 3 according to a preferred embodiment of this invention. In this embodiment, the substrate 21 comprises sensing patterns 22b but comprises free of conductive wires, and each sensing pattern comprises a pad 22c. In contrast, the substrate 20 comprises sensing patterns 22a, conductive wires 23, and one or more conductive components 24/24'.

In this preferred embodiment, the conductive component 24/24' may be an anisotropic conductive film (ACF) or anisotropic conductive paste (ACP) consisted of an adhesive portion 24b and a conductive portion constructed by a plurality of contacts 24a. The contacts 24a are used for electrically connect the sensing patterns 22b, and the adhesive portion 24b is used for providing assistance in bonding the two substrates 20/21. In addition, the conductive wires 23 comprises a first portion 23a and a second portion 23b, in which each conductive wire 23 of the first portion 23a connects one sensing pattern 22a, and each conductive wire 23 of the second portion 23b connects one contact 24a. After an adhesive layer 26 bonds the two substrates 20/21, one contact 24a corresponds to one pad 22c of one sensing pattern 22b. By doing so, the signals of the sensing pattern 22a will be transmitted to the conductive component 24' via the first portion 23a of the conductive wires 23, and the signals of the sensing pattern 22b will be transmitted to the conductive component 24' via the pads 22c, the contacts 24a of the conductive component 24, and the second portion 23b of the conductive wires 23. Then the conductive component 24' electrically connect the printed circuit board 25 (see FIG. 2) for conducting all the signals to a controller (not shown). In another embodiment, the conductive component 24' is omitted and replaced by the printed circuit board 25.

Figure 4:
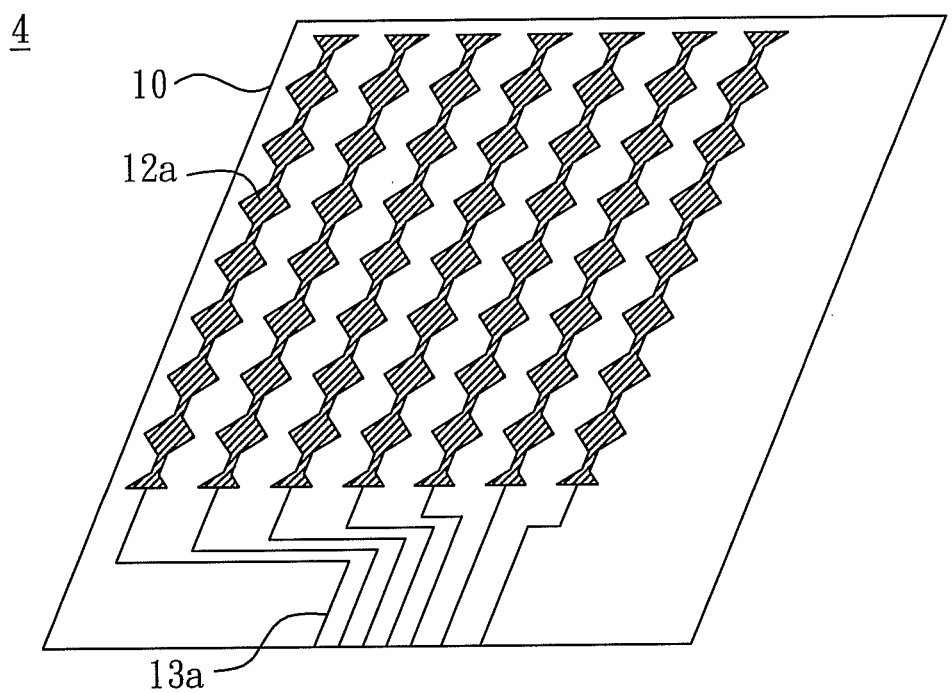
FIG. 4 shows a convention touchscreen for comparing it with the touchscreen of FIG. 3.
Figure 4:
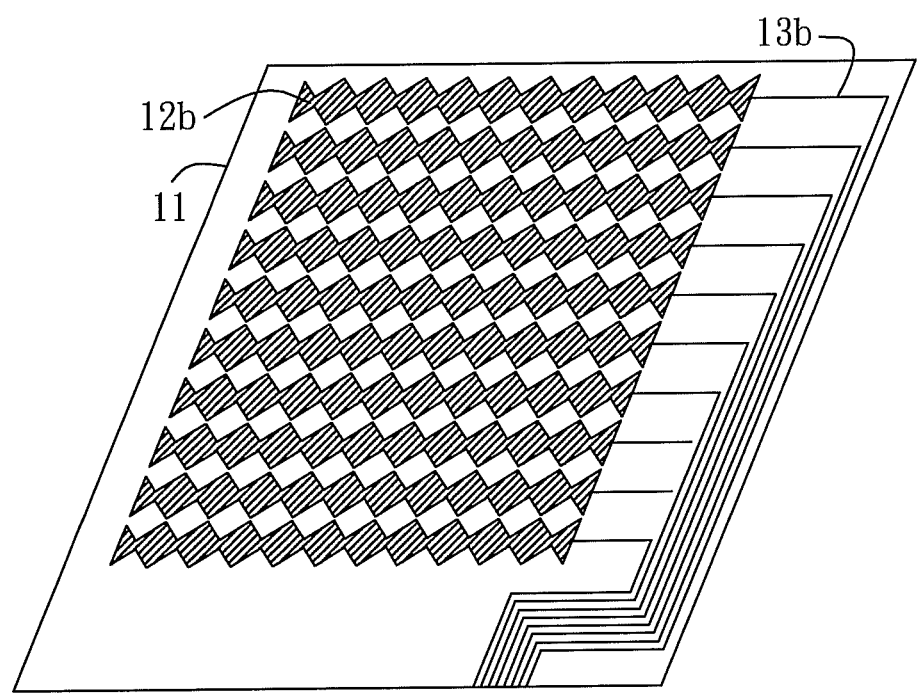

FIG. 4 shows a conventional touchscreen for comparing it with the touchscreen 3 of FIG. 3, in which minor components are omitted for stressing the features. As shown in FIG. 4, the substrate 10 comprises conductive wire layer 13a for connecting sensing pattern layer 12a, and the substrate 11 comprises conductive wire layer 13b for connecting sensing pattern layer 12b. As discussed above, this configuration and method have disadvantage of complicated manufacturing steps, low yield rate, high cost, and large shift during the orientation of the printed circuit board.

Figure 5:
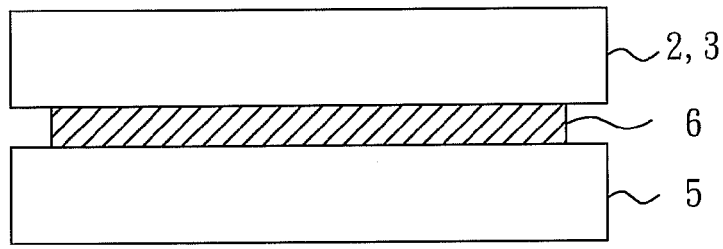
FIG. 5 shows a touch panel display according to an embodiment of this invention.

FIG. 5 shows a touch panel display according to an embodiment of this invention. In this embodiment, the touch panel display primarily comprises the touchscreen 2/3 of the foregoing embodiments, a display 5, and an adhesive layer 6 for bonding the display and the touchscreen 2/3. The display 5 may include, but is not limited to, liquid crystal display (LCD), organic light-emitting diode (OLED) display, and an electroluminescent (EL) display. The liquid crystal display (LCD) is preferred and typically comprise an upper substrate, a thin-film transistor substrate, and a liquid crystal layer arranged between the two substrates.

Figure 6:
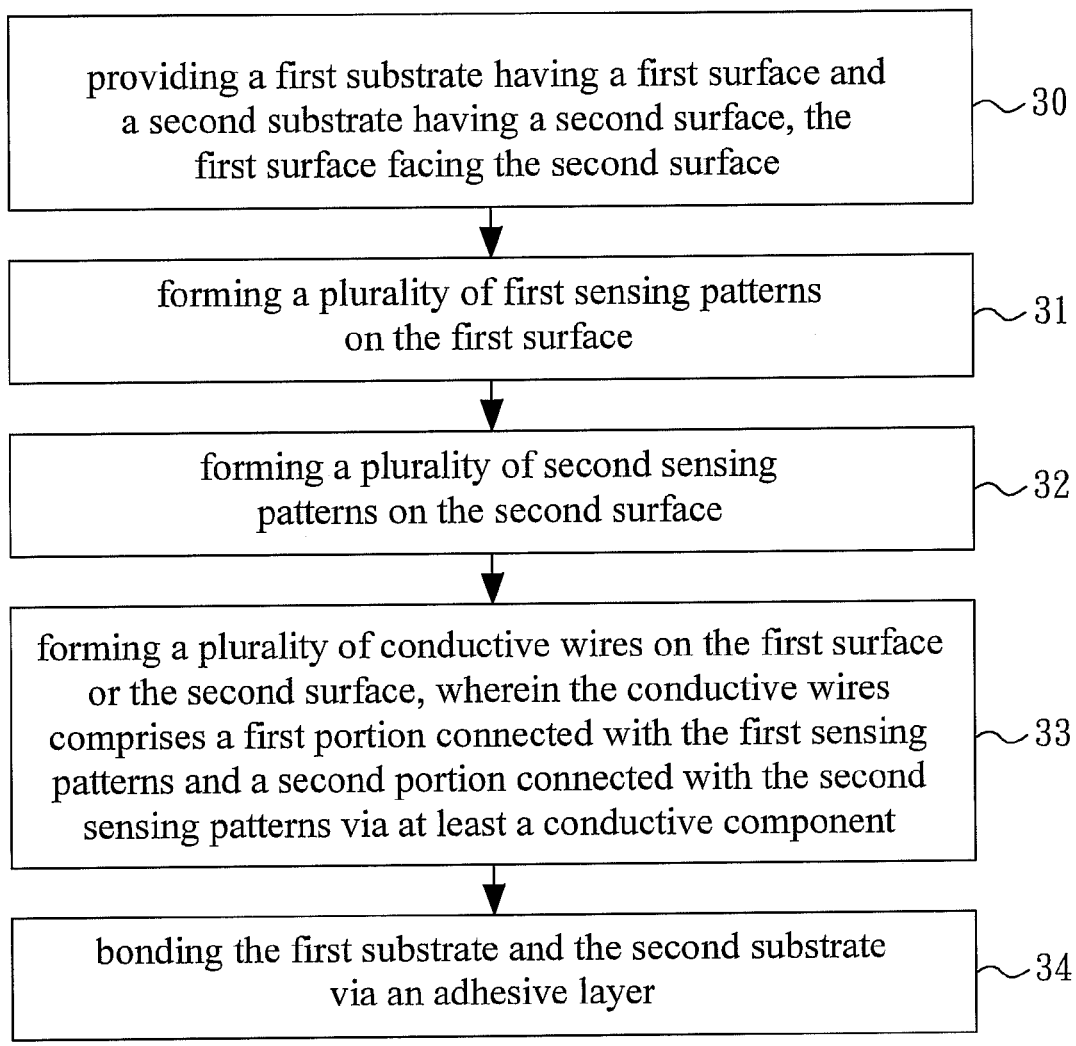
FIG. 6 shows a method for producing a touchscreen according to another embodiment of this invention.

FIG. 6 shows a method for producing a touchscreen according to another embodiment of this invention. Step 30, a first substrate having a first surface and a second substrate having a second surface are provided, in which the first surface faces the second surface. Step 31, a plurality of first sensing patterns are formed on the first surface. Step 32, a plurality of second sensing patterns are formed on the second surface. Step 33, a plurality of conductive wires are formed on the first surface or the second surface, wherein the conductive wires comprises a first portion connected with the first sensing patterns and a second portion connected with the second sensing patterns via at least a conductive component. Step 34, the first substrate and the second substrate are bonded via an adhesive layer. Modifications, alternatives, or variations may be made to this embodiment, and other features of this embodiment may be similar to the foregoing embodiments and the descriptions of which are omitted.

Although specific embodiments have been illustrated and described, it will be appreciated by those skilled in the art that various modifications may be made without departing from the scope of the present invention, which is intended to be limited solely by the appended claims.

What is claimed is:

1. A touchscreen, comprising:
a first substrate having a first surface;
a second substrate having a second surface facing the first surface;
an insulating layer disposed between the first substrate and the second substrate;
a plurality of first sensing patterns disposed between the first substrate and the insulating layer;
a plurality of conductive wires disposed between the first substrate and the insulating layer;
a plurality of second sensing patterns disposed between the second substrate and the insulating layer;
a conductive component electrically connecting the second sensing patterns and the conductive wires; and
a printed circuit board electrically connecting the conductive wires and having conductive traces laid only on its one surface;
wherein the second surface of the second substrate is free of conductive wires; and
wherein the conductive wires comprise a first portion and a second portion, the first sensing patterns connect with the first portion, and the second sensing patterns connect with the second portion via the conductive component; and
wherein the first sensing patterns and the second sensing patterns are used for generating a plurality of touch signals, and the touch signals are transmitted to the printed circuit board via the conductive wires.

2. The touchscreen as recited in claim 1, wherein the conductive component comprises a plurality of contacts, each of the second sensing patterns comprises a pad, and one contact connects with one pad.

3. The touchscreen as recited in claim 1, wherein the conductive component further comprises an adhesive portion for bonding the first substrate and the second substrate.

4. The touchscreen as recited in claim 1, wherein the first substrate is used as a cover lens facing a user.

5. The touchscreen as recited in claim 1, wherein the first substrate is a glass substrate, and the second substrate is a plastic substrate.

6. The touchscreen as recited in claim 1, wherein the second substrate is used a cover lens facing a user.

7. The touchscreen as recited in claim 1, wherein the conductive component comprises an anisotropic conductive film or an anisotropic conductive paste.

8. The touchscreen as recited in claim 1, wherein the first substrate and the second substrate are made of one or more materials selected from a group consisted of glass, polyethylene terephthalate (PET), polycarbonate (PC), polyether sulfone (PES), triacetyl cellulose (TAC), polymethylmethacrylate (PMMA), polyethylene (PE), polyimide (PI), and combinations thereof.

9. The touchscreen as recited in claim 1, further comprising an optical layer disposed between the first sensing patterns and the first substrate or between the second sensing patterns and the second substrate, the optical layer being used to obscure the profiles of the first sensing patterns and the second sensing patterns by locally altering the refractive index.

10. The touchscreen as recited in claim 1, wherein the conductive wires have a loop-shaped configuration.

11. The touchscreen as recited in claim 1, wherein a surface area of the insulating layer is smaller than a surface area of the second substrate, and the insulating layer has an opening and the conductive component and the conductive wires are electrically connected within the opening.

12. A touch panel display, comprising:
a display, for presenting a visual information; and
a touchscreen, allowing a user to perform operations by touching and comprising:
a first substrate having a first surface;
a second substrate having a second surface facing the first surface;
an insulating layer disposed between the first substrate and the second substrate;
a plurality of first sensing patterns disposed between the first substrate and the insulating layer;
a plurality of conductive wires disposed between the first substrate and the insulating layer;
a plurality of second sensing patterns disposed between the second substrate and the insulating layer;
a conductive component electrically connecting the second sensing patterns and the conductive wires;
a printed circuit board electrically connecting the conductive wires and having conductive traces laid only on its one surface;
wherein the second surface of the second substrate is free of conductive wires; and
wherein the conductive wires comprise a first portion and a second portion, the first sensing patterns connect with the first portion, and the second sensing patterns connect with the second portion via the conductive component; and
wherein the first sensing patterns and the second sensing patterns are used for generating a plurality of touch signals, and the touch signals are transmitted to the printed circuit board via the conductive wires.

13. The touch panel display as recited in claim 12, wherein the conductive component comprises a plurality of contacts, each of the second sensing patterns comprises a pad, and one contact connects with one pad.

14. The touch panel display as recited in claim 12, wherein the conductive component further comprises an adhesive portion for bonding the first substrate and the second substrate.

15. The touch panel display as recited in claim 12, wherein the first substrate is a glass substrate, and the second substrate is a plastic substrate.

16. A method for producing a touchscreen, comprising the steps of:
providing a first substrate having a first surface and a second substrate having a second surface, the first surface facing the second surface;
providing an insulating layer between the first substrate and the second substrate;
forming a plurality of first sensing patterns between the first substrate and the insulating layer;
forming a plurality of second sensing patterns between the second substrate and the insulating layer;
forming a plurality of conductive wires between the first substrate and the insulating layer, wherein the conductive wires comprises a first portion connected with the first sensing patterns and a second portion connected with the second sensing patterns via at least a conductive component, and the second surface of the second substrate is free of conductive wires;
providing a printed circuit board electrically connecting the conductive wires and having conductive traces laid only on its one surface, wherein the first sensing patterns and the second sensing patterns are used for generating a plurality of touch signals, and the touch signals are transmitted to the printed circuit board via the conductive wires; and
bonding the first substrate and the second substrate.

17. The method as recited in claim 16, wherein the conductive component comprises:
a conductive portion, for connecting the second sensing patterns and the second portion; and
an adhesive portion, for bonding the first substrate and the second substrate.

18. The method as recited in claim 16, wherein the first substrate is a glass substrate, and the second substrate is a plastic substrate.

* * * * *